(12) United States Patent
Balusu et al.

(10) Patent No.: US 9,171,181 B2
(45) Date of Patent: Oct. 27, 2015

(54) SYSTEMS AND METHODS FOR ENHANCED MOBILE PHOTOGRAPHY

(71) Applicants: Sangeetha Balusu, New York, NY (US); Suraj K. Balusu, New York, NY (US)

(72) Inventors: Sangeetha Balusu, New York, NY (US); Suraj K. Balusu, New York, NY (US)

( * ) Notice: Subject to any disclaimer, the term of this patent is extended or adjusted under 35 U.S.C. 154(b) by 57 days.

(21) Appl. No.: 14/182,235

(22) Filed: Feb. 17, 2014

(65) Prior Publication Data

US 2015/0235048 A1 Aug. 20, 2015

(51) Int. Cl.
*H04N 5/232* (2006.01)
*G06F 21/62* (2013.01)
*H04N 1/00* (2006.01)
*G06F 21/10* (2013.01)

(52) U.S. Cl.
CPC ............ *G06F 21/6245* (2013.01); *G06F 21/10* (2013.01); *H04N 1/00222* (2013.01); *H04N 5/23206* (2013.01)

(58) Field of Classification Search
CPC . H04N 7/141; H04N 2007/145; H04N 7/147; H04N 7/15; H04N 7/155
USPC .................... 348/211.1–211.99, 14.01–14.16
See application file for complete search history.

(56) References Cited

U.S. PATENT DOCUMENTS

| | | | | |
|---|---|---|---|---|
| 6,836,287 | B1 * | 12/2004 | Nakahara ................. | 348/211.12 |
| 7,079,177 | B2 * | 7/2006 | Okazaki et al. .......... | 348/211.12 |
| 7,525,578 | B1 * | 4/2009 | Barbeau .................... | 348/231.3 |
| 8,004,572 | B2 * | 8/2011 | Figueredo et al. ......... | 348/211.8 |
| 8,166,098 | B1 * | 4/2012 | Reardon ..................... | 709/202 |
| 8,330,826 | B2 * | 12/2012 | Cerosaletti et al. ........ | 348/222.1 |
| 8,947,547 | B1 * | 2/2015 | Millikan .................... | 348/211.1 |
| 2004/0198435 | A1 * | 10/2004 | Gauld et al. ............... | 455/556.1 |
| 2008/0137138 | A1 * | 6/2008 | Matoba ....................... | 358/1.15 |
| 2013/0050395 | A1 * | 2/2013 | Paoletti et al. ............. | 348/14.02 |
| 2013/0150115 | A1 * | 6/2013 | Maggenti et al. ........... | 455/518 |
| 2013/0191219 | A1 * | 7/2013 | SanGiovanni et al. .... | 705/14.64 |
| 2013/0290106 | A1 * | 10/2013 | Bradley et al. ............. | 705/14.64 |
| 2014/0078239 | A1 * | 3/2014 | Nakade et al. ............. | 348/14.03 |
| 2014/0096007 | A1 * | 4/2014 | Itoh et al. ................... | 715/732 |
| 2014/0184725 | A1 * | 7/2014 | Wu et al. .................... | 348/14.07 |
| 2014/0196152 | A1 * | 7/2014 | Ur et al. ..................... | 726/26 |
| 2015/0040212 | A1 * | 2/2015 | Kim et al. ................... | 726/19 |
| 2015/0101064 | A1 * | 4/2015 | Taki .............................. | 726/28 |
| 2015/0154795 | A1 * | 6/2015 | Ogale .......................... | 345/420 |

* cited by examiner

*Primary Examiner* — Chia-Wei A Chen
(74) *Attorney, Agent, or Firm* — Suraj K. Balusu

(57) ABSTRACT

Certain embodiments of the disclosed technology allow users who are photographed to control those photographs, even when the photographs are taken from a third party's mobile device. Other aspects of the disclosed technology facilitate candid photographs to be taken of users that want them.

20 Claims, 5 Drawing Sheets

SYSTEMS AND METHODS FOR ENHANCED MOBILE PHOTOGRAPHY

BACKGROUND

The growth of mobile device photography has exploded over the last decade. This is due to a variety of factors, including: the increased number of mobile devices that include a built-in camera, the increased number of owners of such devices, the convenience of not carrying a separate (usually larger) dedicated camera, and the increased quality of cameras built into mobile devices.

Another important factor contributing to the popularity of mobile device photography is the ability to quickly and easily share photographs through web-based social networks, as the mobile devices on which the pictures are being taken include internet access to those social networks. For example, mobile device users can take photographs of themselves and their friends when they are at an event, and can then immediately share those pictures with their online "followers" by posting those pictures to their social network, such as Facebook® or Instagram®, directly from their mobile device. Mobile device photographs are also shared through private communication applications, such as Multimedia Messaging Service ("MMS") applications. In addition, certain private communication applications, such as Snapchat® and Idelete®, provide users with the ability to send photographs that are only viewable by the recipient for a limited period of time.

SUMMARY

The present invention is directed to new systems and methods for mobile device based photography. Certain aspects of the disclosed technology allow users who are photographed to control those photographs, even when the photographs are taken from a third party's mobile device. Other aspects of the disclosed technology facilitate candid photographs to be taken of users that want them.

The features of the present invention can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Embodiments of the disclosed technology will be described more fully hereinafter with reference to the accompanying drawings, in which certain embodiments of the disclosed technology are shown. This disclosed technology may, however, be embodied in many different forms and should not be construed as limited to the embodiments set forth herein.

While the embodiments disclosed are described with respect to photographs, it is understood by those skilled in the art that the same systems and methods apply to any recordable content, such as video and audio.

Certain embodiments of the disclosed technology include systems and methods for facilitating candid photographs to be taken of users that want them. People enjoy candid photography—that is, photographs that are taken without being posed for, and sometimes without the immediate knowledge of the person being photographed—because it looks more natural and interesting. Additionally, candid photographs from various people provide different perspectives.

Figure 1:
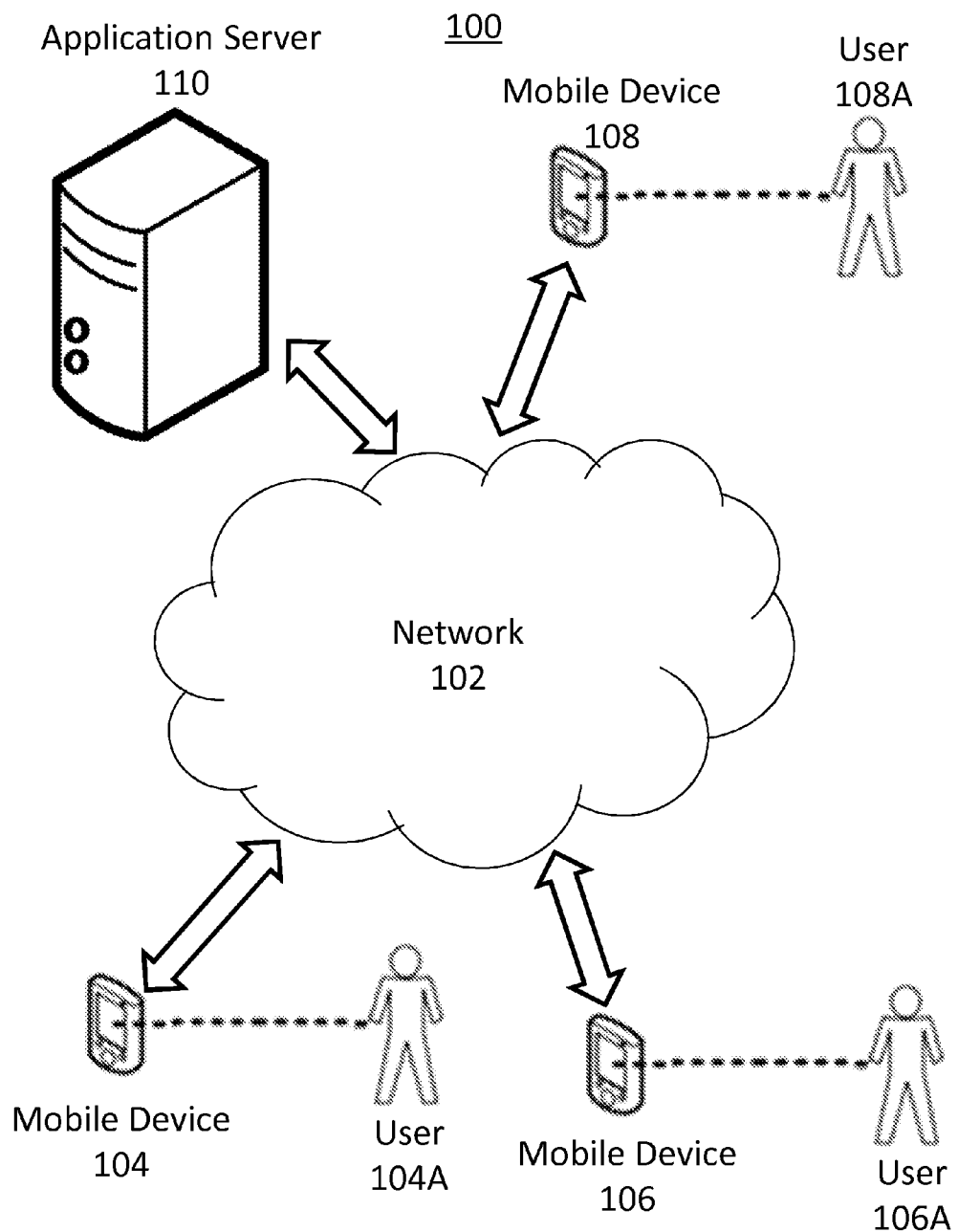
FIG. 1 is a block diagram of a mobile device photography system, according to certain embodiments of the disclosed technology.

FIG. 1 illustrates a mobile device photography system 100 in accordance with certain embodiments. One or more mobile devices 104, 106, 108 may be in communication with network 102. Although only three mobile devices are shown, it should be understood that more than three mobile devices may be in communication with network 102 and part of system 100. Network 102 may include a local area network, a wide area network, the internet, etc. Mobile devices 104, 106, 108 may communicate with network 102 wirelessly or via wired connections. Mobile devices 104, 106, 108 include a central processing unit, camera, global positioning system ("GPS"), a display, and a software application for implementing the features of the present invention ("Photography Application"). Each mobile device 104, 106, 108 is utilized by a respective user 104A, 106A, 108A. Application Server 110 can communicate with and/or manage certain portions of the Photography Application. It should be understood that application server 110 may comprise one or more computers, and may be part of a cloud computer system.

Figure 2:
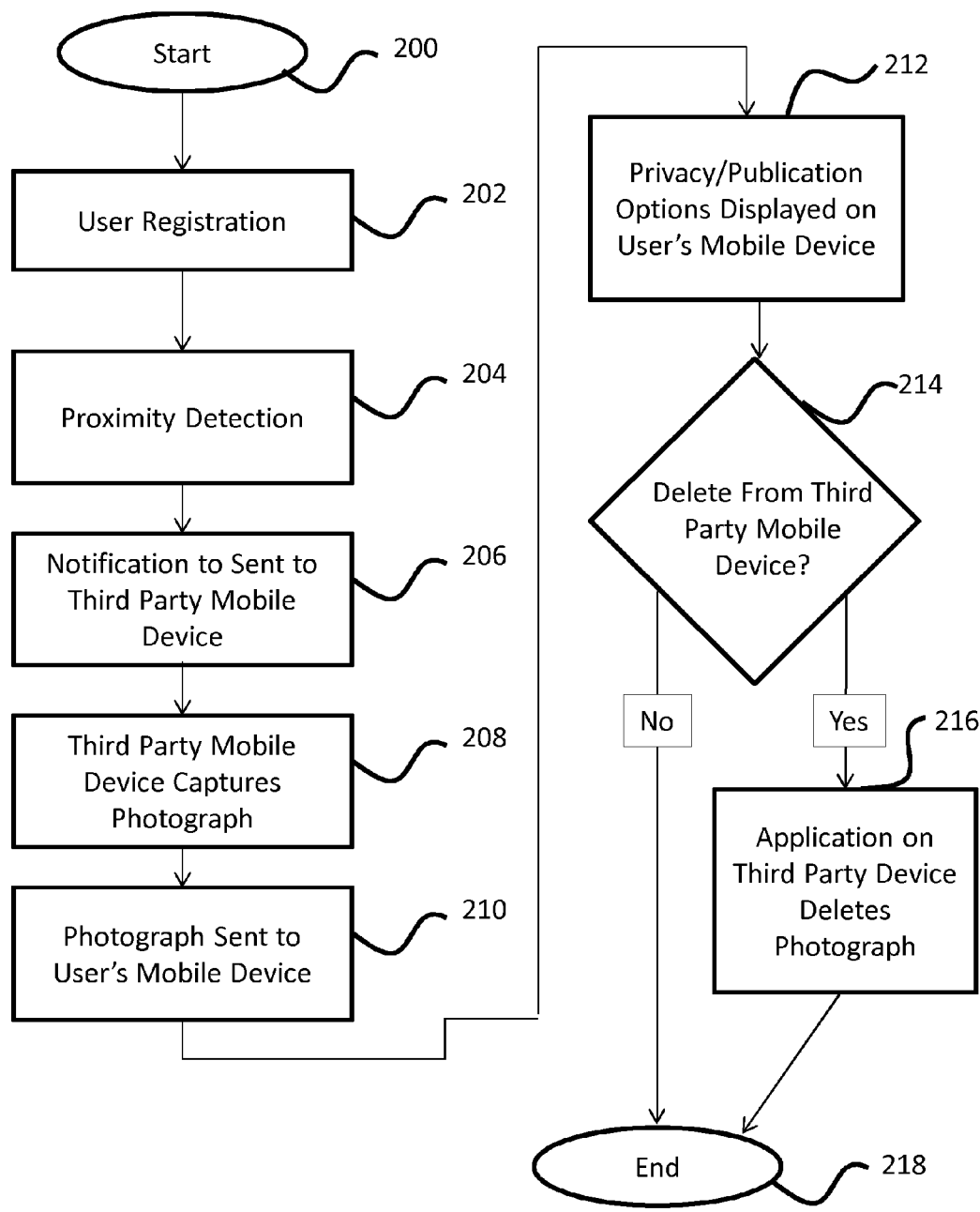
FIG. 2 is flow diagram of a mobile device photography method, according to certain embodiments of the disclosed technology.

FIG. 2 depicts a flowchart of a mobile device photography method, according to an embodiment. At step 200, the process starts. A user registers with the photography system through the Photography Application that has been downloaded to the user's mobile device (or through a website), step 202. During this registration, the user can indicate their involvement in the candid photography program by selecting whether they: 1) would like other users ("third parties" or "third party") to take candid photographs of them, 2) would like to take candid photographs of third parties, or 3) both. The registration process will also obtain the necessary permission for the Photography Application to access the user's mobile device's GPS (or other location determination means), to determine when the user's mobile device is within a predetermined distance of a third party's mobile device. Optionally, the user can provide locations, times or dates when they do not want the GPS or Photography Application active; for example, at work or during working hours. Of course, the user can also be provided with the option to manually change the GPS or other settings as they wish.

If the user has chosen to allow candid photographs of them to be taken, the user can also select how they would like those photographs to be treated at the third parties' mobile devices ("third party permissions"). For example, the user could choose to have photographs taken of them by third parties: 1) deleted immediately after they are taken, 2) deleted after a certain period of time, 3) restricted from being shared (emailed, sent via MMS, uploaded to social media networks/websites, etc.), or 4) kept without any restrictions. Default third party permissions may be selected during registration. In certain embodiments, third party permissions could be determined (or the defaults overridden) by the user on a case-by-case basis when such a picture is taken or received.

During registration, the user also creates a profile. The profile could be as simple as a photograph of the user, so the third party knows who to take a picture of. Optionally, the user's profile could also be linked to one or more of the user's social network accounts.

A proximity detection, step 204, occurs when the user's mobile device is within a predetermined distance of a third party's mobile device. In one embodiment, the user can preselect the distance that will trigger a positive proximity detection. If the user has opted only to be photographed, and the third party has opted to only photograph others, then the process continues. If the user and the third party both opted to be photographed and to photograph others, then a role selection will take place before the process continues to determine who will be photographed and who will be the photographer. The role selection may be determined by various means, such as randomly, based on profile preferences, based on comparative statistics of the users (e.g., number of photographs each user has taken, number of photographs each user has taken of them, points, etc.), notifications to the users, etc. If both users have selected to only photograph others, or to only be photographed, then the process ends. In one embodiment, each users' mobile devices' location data is periodically sent to the Application Server 110 (for example, through the Photography Application), and the Application Server 110 determines whether there is a proximity detection is triggered. The Application Server 110 can also perform the role selection described above.

At step 206, a notification is sent from the Application Server 110 to the third party that the user is within the proximity, and that their photograph should be taken if possible. The notification may be in the form of a pop-up window. In certain embodiments, the users who are going to be photographed may pre-select whether they also want to be notified that their picture is going to be taken when a proximity detection is triggered, or whether they wish to only receive a notification after their picture is taken in order to obtain more candid photographs.

After receiving the notification, step 206, the third party opens the Photography Application on their mobile device. In certain embodiments, the third party's native camera application (or other camera applications or photograph storage) will be disabled or locked out once the third party opens the Photography Application to see who the "target" (user) is. The camera lockout can continue for a preset time or until the user "clears" the third party's lockout. The lockout time, which could also be variable based on the user, could be displayed in the notification to the third party before the Photography Application is opened to see the user profile (providing the third party with the option of foregoing the photography session if she does not agree with the lockout period). This lockout feature ensures that third parties do not use their native camera program to circumvent the third party permissions set by the user.

The third party is provided with the user's profile after opening the Photography Application, and then takes one or more pictures of the user, step 208. The Photography Application restricts the third party's access to these pictures, based on the user's default third party permissions. The pictures are then sent from the third party's mobile device to the user's mobile device (for example, via the Application Server 110), step 210. Through the Photography Application, third party permission options are displayed on the user's mobile device, step 212, and the user is able to select (or override default) third party permissions, step 214. For example, the user may decide whether one or more of the photographs should be deleted from the third party's mobile device. If the user selects deletion, the Photography Application on the third party's mobile device deletes the selected photographs (or implements the selected third party permissions), step 216. The process ends at step 218.

The user is also provided with options to share the received photographs. For example, if the user provided her social network data during registration (or later), the user can immediately post the received photographs to the selected social network sites with the selection of an appropriate button. The user can also have the photographs taken of her automatically posted to her social network site.

In certain embodiments, the third party permission features described above are utilized independent of the candid photography program. For example, if a user does not like being photographed because they are selective of the pictures they want publicly available, the present invention provides the means for the user to select which photographs are kept, and which are destroyed, even when the picture is being taken from a third party's mobile device. In certain embodiments, the third party requests permission, through the Photographer Application on her mobile device, to take a picture of the user. The user is able to accept or decline this request through the Photography Application on the user's mobile device. The user's mobile device is then provided with each of the pictures taken, and can choose third party permission options, including the deletion of the photographs from the third parties mobile device. Photographs on the third party's mobile device can be restricted such that they cannot be shared (e.g., via email, MMS, or uploading), and restricted such that the user has the ability to delete pictures taken of her even after long periods of time.

In certain embodiments, the third party cannot access their mobile device's native camera application (or other camera application) outside of the Photography Application until the user selects an option, through the Photography Application on her mobile device, to withdraw the restriction (when the photography session is over), or until a predetermined amount of time has lapsed. The predetermined amount of time for a third party's native camera lockout could be selected by the user in advance, and could be displayed on the third party's mobile device when initial request to photograph is made (providing the third party with the option of foregoing the photography session if she does not agree with the lockout period). Optionally, the Photography Application can cause the third party's mobile device to provide an indication that Photography Application is being used (such as a certain LED color or blinking pattern).

In certain embodiments, users are incentivized to take photographs of other users by awarding "points" to users for photographs taken. The amount of points awarded to the user can be based on the photographed user's (or others) rating of the picture. For example, if a particularly good photograph is taken of user 1 by user 2, then user 1 may rate the photograph highly, resulting in a higher number of points being awarded to user 2. In certain embodiments, users can award their own points to other users. Points can be given monetary value (e.g., exchanged for products/services) similar to credit card points. Points can also simply be a metric of the users' performance, with more points indicating greater prestige.

Various embodiments of the communication systems and methods herein may be embodied in non-transitory computer readable media for execution by a data processor. In certain embodiments, a mobile device is used, such as a smartphone or tablet, but other computing devices may also be used.

Figure 3:
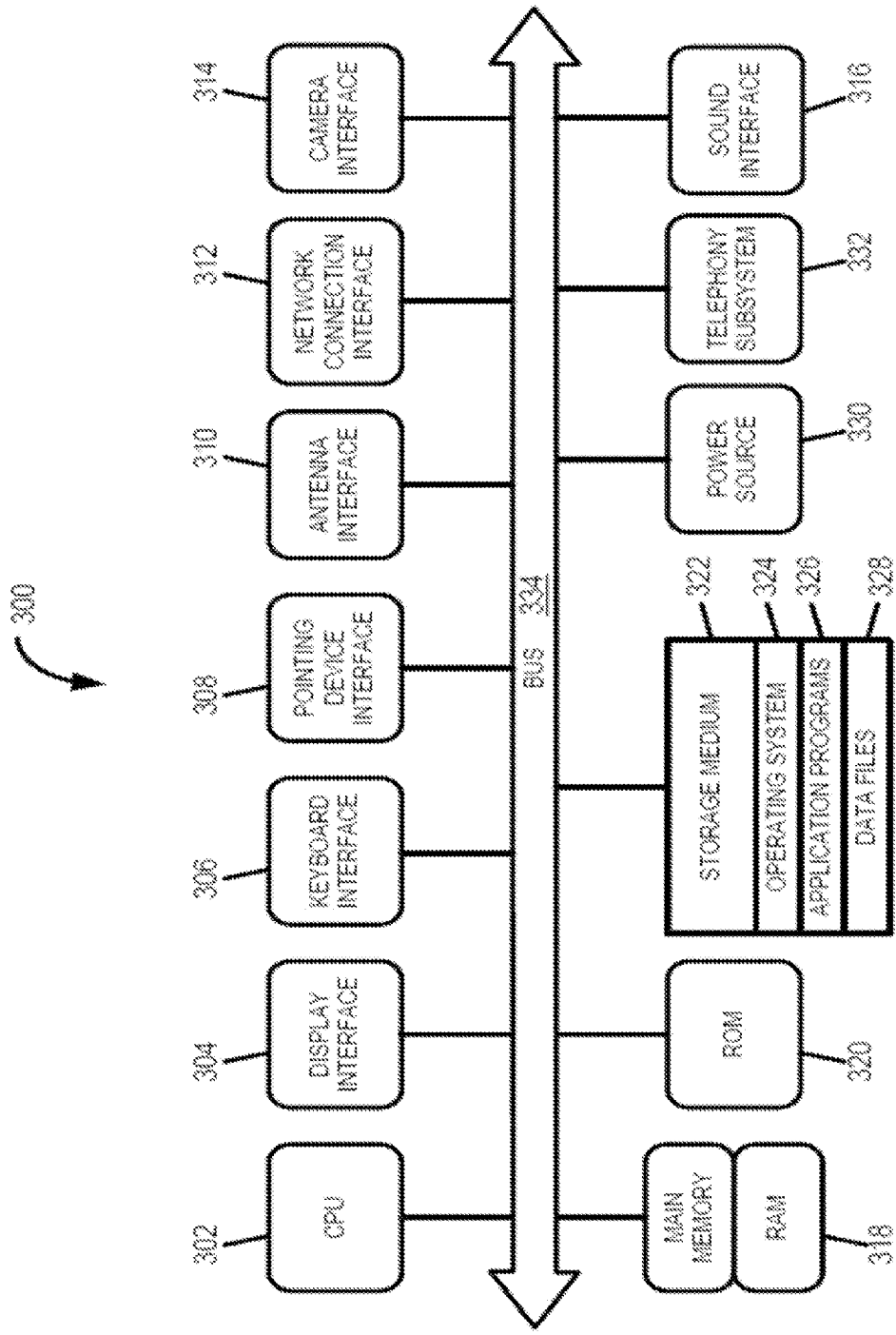
FIG. 3 is a block diagram of an illustrative mobile device, according to certain embodiments of the disclosed technology.

FIG. 3 depicts a block diagram of the architecture of mobile device 300 (for example, corresponding to mobile devices 104, 106, 108 in FIG. 1) according to an embodiment of the disclosed technology. Certain aspects of FIG. 3 may also be embodied in an external system.

Mobile device 300 includes a central processing unit (CPU) 302 (which can comprise more than one CPU or core); a display interface 304 that acts as a communication interface and provides functions for rendering video, graphics, images, and texts on the display; a keyboard interface 306 that provides a communication interface to a keyboard; and a pointing device interface 308 that provides a communication interface to a pointing device or a presence-sensitive display such as a touch screen. Display interface 304, keyboard interface 306, and pointing device interface 308 may be embodied in a single unit, such as a presence sensitive display or touch screen. Various embodiments of the methods described herein may be embodied in non-transitory computer readable media, such as storage medium 322, for execution by CPU 302. Embodiments of the mobile device 300 may include an antenna interface 310 that provides a communication interface to an antenna; a network connection interface 312 that provides a communication interface to a network. A camera interface 314 is provided that acts as a communication interface and provides functions for capturing digital images from a camera. In certain embodiments, a sound interface 316 is provided as a communication interface for converting sound into electrical signals using a microphone and for converting electrical signals into sound using a speaker. According to various embodiments, a random access memory (RAM) 318 is provided, where computer instructions and data are stored in a volatile memory device for processing by the CPU 302.

According to an embodiment, the mobile device 300 includes a read-only memory (ROM) 320. The mobile device 300 includes a storage medium 322 or other suitable type of memory, where the files include an operating system 324, application programs 326 (including, for example, the Photography Application) and data files 328 (including photographs) are stored. According to an embodiment, the mobile device 300 includes a power source 330 that provides an appropriate alternating current (AC) or direct current (DC) to power components. According to an embodiment, the mobile device 300 includes and a telephony subsystem 332 that allows the mobile device 300 to transmit and receive sound over a telephone network. The constituent devices and the CPU 302 communicate with each other over a bus 334.

Figure 4:
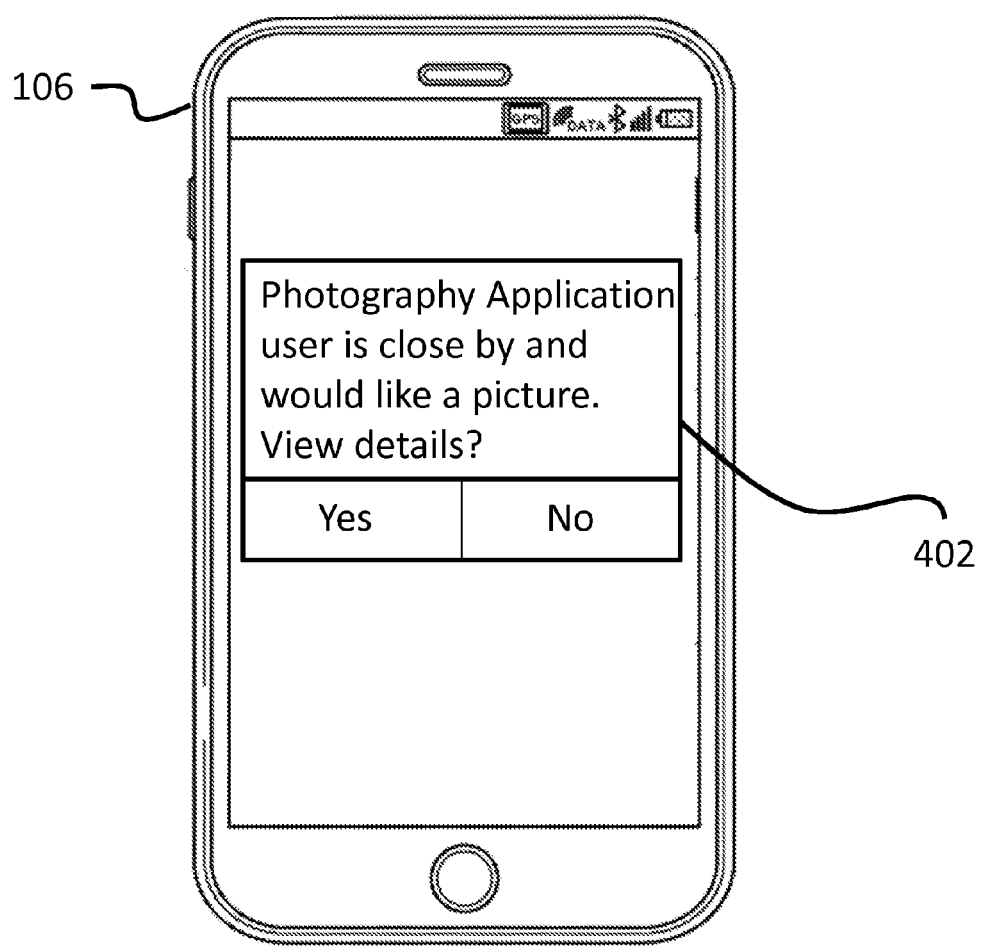
FIG. 4 shows an illustrative mobile device, according to certain embodiments of the disclosed technology.
Figure 5:
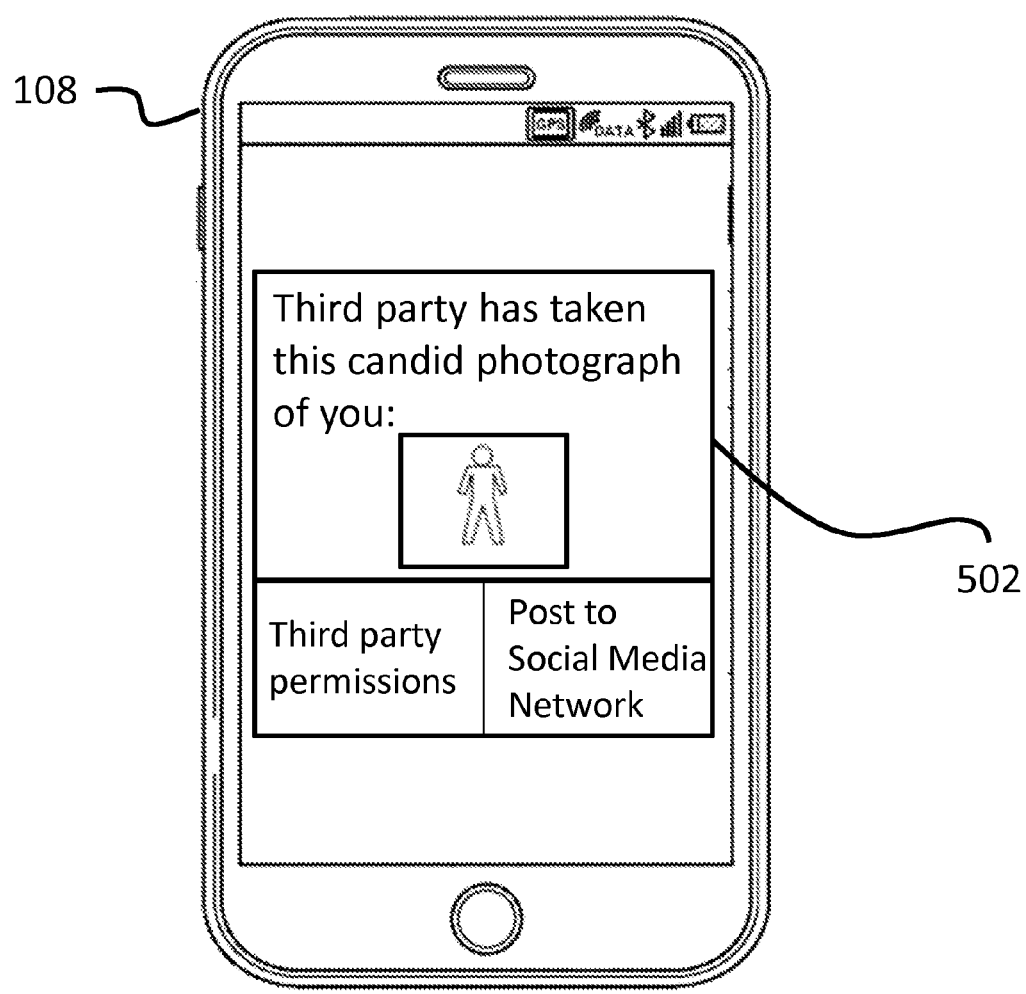
FIG. 5 shows an illustrative mobile device, according to certain embodiments of the disclosed technology.

FIGS. 4-5 show user 106A's mobile device 106 and user 108A's mobile device 108 exhibiting the candid photography functionality of the present invention, according to certain embodiments. In FIG. 4, Application Server 110 has sent a notification 402 to mobile device 106 indicating that mobile device 108 is within the preset proximity range, and that user 108A would like a candid photograph taken of her. (It is understood that in the description above, the Photography Application user that is assigned the role of photographer (taking the picture) is referred to as "third party"). If user 106A confirms that she would like to take user 108A's photograph: 1) user 106A will be presented with user 108A's profile (which will include a picture of user 108A's face so she can be identified by user 106A), and 2) in certain embodiments, the native camera application lockout and photograph security features discussed above will be implemented.

In FIG. 5, after a photograph of user 108A has been captured by mobile device 106, the Application Server 110 will send notification 502 to mobile device 108, which includes the photograph. The user 108A will be given the option of posting the photograph to her social network(s) (or share the photograph through other means), and will also be given a chance to choose (or override her default) third party permission for the photograph stored on mobile device 106 (for example, choosing that the photograph be deleted from mobile device 106). In certain embodiments, for added security, the photograph taken by the third party is immediately deleted from the third party's mobile device after it is sent to the Application Server 110, and is only restored to the third party's mobile device if the photographed user affirmatively selects the appropriate third party permission.

As used herein, the term "recording" can be any recordable content, such as a photograph, video, or audio. As used herein, the phrase "consented to being recorded" means agreed to being one or more of: photographed, video recorded, and audio recorded.

Certain embodiments of the disclosed technology are described above with reference to block and flow diagrams of systems and methods and/or computer program products according to various embodiments of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

While certain embodiments of the disclosed technology have been described in connection with what is presently considered to be the most practical and various embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

The patentable scope of certain embodiments of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system, comprising:
   a computing device configured to:
   receive location information from a first user's first mobile device and a second user's second mobile device, wherein said first user has consented to being recorded;
   determine whether said first mobile device and said second mobile device are within a predefined distance of each other;

send a notification to said second mobile device;
receive a recording, wherein said recording was captured by a camera in said second mobile device;
send said recording to said first mobile device; and
send a privacy permission associated with said recording to said second mobile device, wherein said privacy permission relates to the second mobile device's ability to store, display or transmit the recording.

2. The system of claim 1 wherein the recording is a photograph.

3. The system of claim 1 wherein the recording is a video.

4. The system of claim 1 wherein said second user has indicated a willingness to take recordings of others.

5. The system of claim 1 wherein restrictions are placed on the second mobile device's recording storage or camera function.

6. The system of claim 1 wherein said privacy permission causes said recording to be deleted from second mobile device, not be displayed on second mobile device, or not be transmitted from second mobile device.

7. The system of claim 1 wherein said notification comprises an inquiry of whether said second user would like to take a recording of said first user.

8. A method, comprising:
determining, by a global positioning system in a second mobile device, the location of the second mobile device;
sending, via a network connection, said determined location of the second mobile device;
receiving, via the network connection, a notification that a first user's mobile device is within a predefined distance of said second mobile device;
receiving, via the network connection, information relating to said first user;
sending, via the network connection, a recording, wherein said recording is captured by a camera in said second mobile device; and
receiving, via the network connection, a privacy permission associated with said recording, wherein said privacy permission relates to the second mobile device's ability to store, display or transmit the recording.

9. The method of claim 8 wherein the recording is a photograph.

10. The method of claim 8 wherein the recording is a video.

11. The method of claim 8 wherein said second user has indicated a willingness to take recordings of others.

12. The method of claim 8 wherein restrictions are placed on the second mobile device's recording storage or camera function.

13. The method of claim 8 wherein said privacy permission causes said recording to be deleted from second mobile device, not be displayed on second mobile device, or not be transmitted from second mobile device.

14. The method of claim 8 wherein said notification comprises an inquiry of whether said second user would like to take a recording of said first user.

15. A non-transitory computer-readable storage medium with an executable program stored thereon, wherein the program instructs a data processor to perform the following steps:
determine, by a global positioning system in a second mobile device, the location of the second mobile device;
send, via a network connection, said determined location of the second mobile device;
receive, via the network connection, a notification that a first user's mobile device is within a predefined distance of said second mobile device;
receive, via the network connection, information relating to said first user;
send, via the network connection, a recording, wherein said recording is captured by a camera in said second mobile device; and
receive, via the network connection, a privacy permission associated with said recording, wherein said privacy permission relates to the second mobile device's ability to store, display or transmit the recording.

16. The non-transitory computer-readable storage medium of claim 14 wherein the recording is a photograph.

17. The non-transitory computer-readable storage medium of claim 14 wherein the recording is a video.

18. The non-transitory computer-readable storage medium of claim 14 wherein said second user has indicated a willingness to take recordings of others.

19. The non-transitory computer-readable storage medium of claim 14 wherein restrictions are placed on the second mobile device's recording storage or camera function.

20. The non-transitory computer-readable storage medium of claim 14 wherein said privacy permission causes said recording to be deleted from second mobile device, not be displayed on second mobile device, or not be transmitted from second mobile device.

* * * * *